United States Patent Office 3,137,345
Patented June 16, 1964

3,137,345
INCREASING MISCIBLE FLOODING EFFICIENCIES
Robert R. Harvey and Emery M. Craighead, Bartlesville, Okla., assignors to Phillips Petroleum Company, a corporation of Delaware
No Drawing. Filed July 29, 1960, Ser. No. 46,074
11 Claims. (Cl. 166—9)

This invention relates to a method of improving flood efficiency in a miscible fluid flood by the addition of materials which initiate or augment the production of solid films at the crude oil-connate water interface. In one aspect it relates to the addition of high molecular weight organic acids and alcohols to the miscible solvent phase to form solid interfacial films between the hydrocarbon solvent on the one side and the reservoir connate water on the other side.

Connate water is normally present in almost all oil reservoirs. In miscible fluid flooding, the viscosity of the inejcted fluid is greatly less than that of the crude oil in place or of the interstitially disposed connate water. As a result, the injected fluids, usually a hydrocarbon derived from petroleum, followed by a second driving fluid, tend to slip by the oil in the pores of the formation. A typical crude oil may itself contain natural substances capable of forming solid films at the crude oil-connate water interface. However, an injected hydrocarbon solvent, in a miscible fluid flood, does not. Moreover, since the oil solvent slug, usually liquefied petroleum gas, is generally of lower viscosity than the crude oil in place, and also of lower density, these factors tend to permit early (premature) breakthrough of the solvent slug. The result is poor volumetric sweep efficiency, and the by-passing of oil in place in this manner is generally regarded as the greatest deficency of miscible phase flooding, particularly so with liquefied petroleum gas as the oil solvent.

In the case where hydrocarbons derived from petroleum are used as the displacement fluids, with natural gas as the final displacement material, fingering likewise may break the continuity of the front between the natural gas and the immediately preceding displacement fluid, usually liquefied petroleum gas, with movement of the gas toward the petroleum front. This is disadvantageous, even though breakthrough into the petroleum in place does not occur. Since, in general, the hydrocarbon fluids used are more valuable than natural gas, it is desirable to recover them as completely as possible by natural gas drive; but where fingering does occur, there will be recovered mixtures of hydrocarbon fluids and natural gas, with substantial amounts of the more valuable injected hydrocarbon fluids remaining in the reservoir. This also is economically disadvantageous even though the recovery of petroleum itself is not seriously impaired by the breakthrough.

We have found that the presence of natural or artificial solid films at the hydrocarbon solvent-connate water interface will measurably increase the percentage of crude oil in place that may be recovered prior to breakthrough. According to the present invention, these films can be artificially created by incorporation into the hydrocarbon solvent of a selected additive. We have further discovered that the high molecular weight organic acids, commonly referred to as the fatty acids, and their corresponding alcohols, are particularly suited to the object of this invention. Though the additive is initially disposed in the hydrocarbon solvent phase, it tends to migrate and concentrate at the solvent-connate water interface. One end of the molecule, usually the carboxylic or hydroxy group, being more hydrophilic than the other, anchors itself in the water phase, while the other relatively hydrophobic end of the molecule, usually the alkyl group, locates in the hydrocarbon solvent phase. Thus, as the molecules randomly migrate to the interface, they become oriented in the aforementioned fashion. The effect is the buildup of a solid film at the hydrocarbon solvent-connate water interface, which reduces the mobility of the flooding medium, resulting in higher sweep efficiency and thus greater ultimate oil recovery.

It is, therefore, an object of this invention to provide an improved method of miscible phase flooding by the creation of new solid films at the oil solvent-connate water interface.

It is another of this invention to substantially reduce the amount of oil solvent required for injection, and subsequently the equipment and power needs for separation from the produced mixed hydrocarbon fluid.

Still another object of this invention is to provide a novel solid film forming additive for the flooding medium, where it is an oil solvent.

A yet further object is to increase the percentage of oil in place produced prior to breakthrough of the flooding medium.

Other objects, advantages and features of this invention will become apparent to those skilled in the art without departing from the spirit and scope of this invention.

The improved method for secondary recovery of hydrocarbons from a hydrocarbon bearing formation employing the miscible fluid flooding system is shown schematically in the following flow diagram:

---

First driving fluid which is a hydrocarbon fluid normally miscilble with formation hydrocarbons includes an additive selected from the group consisting of high molecular weight aliphatic acids and alcohols ranging from 12 to 20 carbon atoms in chain length, said additive initially in solution in said first fluid in a concentration ranging between 0.001 and 0.1 molal.

↓

Injecting a slug of said first fluid into a hydrocarbon bearing formation via an input well penetrating same.

↓

Injecting a second driving fluid after said first fluid through said input well.

↓

Producing formation hydrocarbon and driving fluid from at least one producing well penetrating said formation until the ratio of driving fluids to formation fluid becomes uneconomical.

---

The object of this invention may be accomplished by the addition of a film-forming additive to the flooding medium storage tank in an amount so as to yield a solution ranging between 0.001 and 0.1 molal, and preferably between 0.001 and 0.01 molal.

For addition to a miscible solvent phase, in order to form a solid interfacial film between said solvent on the one side and the reservoir connate or interstitial water on the other side, we prefer to use any one or mixture of a number of high molecular weight organic acids or aliphatic alcohols.

Among the fatty acids suitable for use in this invention are: dodecanoic acid, tetradecanoic acid, hexadecanoic acid, octadecanoic acid and eicosanoic acid.

Among the aliphatic alcohols suitable for use in this invention are: dodecyl alcohol, tetradecyl alcohol, hexadecyl alcohol, octadecyl alcohol, and eicosyl alcohol.

As the second driving fluid, or final displacement material, any of a number of fluids, such as dry natural gas, flue gas, carbon dioxide, hydrogen sulfide, and even water, may be injected behind the hydrocarbon solvent.

An example which demonstrates, under controlled laboratory conditions, the effect of film formation on displacement systems, differing only by the presence or absence of films, is given:

EXAMPLE

A system chosen for a laboratory model study was: normal hexadecane as a substitute for oil, water as the flooding medium, and glass beads to simulate the porous formation. A series of experimental runs were conducted in a stainless tube 3 feet long and 2 inches in diameter. The glass beads, which were U.S. 60 screen, number 11 grade, were retained by stainless steel screens at each end of the said tube. The ends of the tube were closed with bolted flanges and a seal was made with flat Teflon gaskets 0.005 inch thick. Fluid was admitted and produced through ¼ inch brass petcocks in the end flanges. Regulated air pressure applied to the cylinders containing the fluid supplied to the column, was used to force the fluids into the packing. The effluent end of the tube was always kept at atmospheric pressure.

The volume of the empty tube was initially determined by first weighing it when empty and then when filled with water. Packing of the tube was carried out while it was being vibrated with an electrical vibrator. The packs were saturated under vacuum with previously vacuum-deaerated, n-hexadecane and water. A series of eight runs were carried out, specifically:

Table I
RECONSTITUTION AND FLOODING PROCEDURE

Run No.: Procedure
1 — Saturated with pure n-hexadecane, water flooded to water-oil-ratio (WOR)=100.
2 — Saturated with n-hexadecane/$5 \times 10^{-3}$ molal stearic acid, flooded to water-oil-ratio (WOR) =100.
3 — Same as 2.
4 — Same as 1.
5 — Saturated with water, flooded with pure n-hexadecane to water-oil-ratio (WOR)=0.01, then water flooded to water-oil-ratio (WOR)=100.
6 — Saturated with water, flooded with pure n-hexadecane to water-oil-ratio (WOR)=0.01, flooded with n-hexadecane/$5 \times 10^{-3}$ molal stearic acid to stearic acid breakthrough, water flooded to water-oil-ratio (WOR)=100.
7 — Saturated with water, flooded with n-hexadecane/$5 \times 10^{-3}$ molal stearic acid to water-oil-ratio (WOR)=0.01, water flooded to water-oil-ratio (WOR)=100. (Approximately 15 hours delay between last two steps.)
8 — Same as 7, but with no delay between steps.

All runs were conducted under a pressure gradient of 0.25 p.s.i. per foot and were terminated at a water-oil ratio of 100:1.

Table II gives the conditions of each run with the resulting porosities and initial saturation.

Table II

| Run No. | Conditions | Porosity (Percent) | Initial Saturations, Percent | |
|---|---|---|---|---|
| | | | $S_{oil}$ | $S_{water}$ |
| 1 | NC, NF | 36.6 | 100 | 0 |
| 2 | NC, F | 36.4 | 100 | 0 |
| 3 | NC, F | 36.4 | 100 | 0 |
| 4 | NC, NF | 36.5 | 100 | 0 |
| 5 | C, NF | 36.6 | 86.5 | 13.5 |
| 6 | C, F | 36.5 | 93.6 | 6.4 |
| 7 | C, F | 36.6 | 92.5 | 7.5 |
| 8 | C, F | 36.4 | 93.7 | 6.3 |

C=connate water present. NC=no connate water present. F=film forming material added. NF=no film forming material added.

Table III gives production data indicating oil recovery as a percentage of oil in place, water injected in terms of the pore volumes, and production time in seconds. Each of the above categories being broken down into three production phases; namely, (1) start to breakthrough, (2) breakthrough to water-oil-ratio (WOR)=100, and (3) total to water-oil-ratio (WOR)=100.

Table III

| Run No. | Conditions | Oil Recovery (Percent of Oil in Place) | | | Water Injected (Pore Volumes) | | | Production Time (Seconds) | | |
|---|---|---|---|---|---|---|---|---|---|---|
| | | Start to Breakthrough | Breakthrough to WOR=100 | Total to WOR=100 | Start to Breakthrough | Breakthrough to WOR=100 | Total to WOR=100 | Start to Breakthrough | Breakthrough to WOR=100 | Total to WOR=100 |
| 1 | NC, NF | 49.8 | 42.0 | 91.8 | 0.49 | 3.12 | 3.61 | 1,800 | 6,180 | 7,980 |
| 2 | NC, F | 77.6 | 7.3 | 84.9 | 0.78 | 1.31 | 2.09 | 4,568 | 3,747 | 8,315 |
| 3 | NC, F | 78.9 | 1.5 | 80.4 | 0.79 | 0.65 | 1.44 | 4,841 | 1,730 | 6,571 |
| 4 | NC, NF | 53.3 | 42.3 | 95.6 | 0.54 | 2.88 | 3.42 | 2,959 | 7,994 | 10,953 |
| 5 | C, NF | 63.1 | 18.5 | 81.6 | 0.55 | 2.14 | 2.69 | 5,044 | 10,004 | 15,048 |
| 6 | C, F | 69.7 | 13.8 | 83.5 | 0.65 | 1.07 | 1.72 | 6,661 | 9,395 | 16,056 |
| 7 | C, F | 72.5 | 10.0 | 82.5 | 0.56 | 2.44 | 3.00 | 4,868 | 12,334 | 17,202 |
| 8 | C, F | 73.1 | 10.7 | 83.8 | 0.69 | 1.75 | 2.44 | 5,695 | 9,217 | 14,912 |

The system: normal hexadecane, water, stearic acid, and glass beads, appeared quite successful in giving reproducible assemblies for the demonstration of the effect of film formation from the hydrocarbon solvent phase on oil recovery prior to breakthrough and total oil production. The presence of films leads to a definite and pronounced increase in the amount of oil recovered before breakthrough. It also shows that some total oil production is sacrificed for the greater economic production achieved prior to breakthrough. The beneficial effect of the presence of films is reduced, but still not removed by the presence of connate water.

Various modifications and alterations of this invention will become apparent to those skilled in the art without departing from the scope and spirit of this invention and it should be understood that the latter is not necessarily limited to the aforementioned discussion.

We claim:

1. In a method of recovering hydrocarbons from a hydrocarbon bearing formation that is substantially devoid of natural fluid energy, having at least one input well and at least one producing well penetrating said formation, and employing the miscible fluid flooding system in which said hydrocarbons are displaced from said formation by injecting into said input well two driving fluids, the first of which is a hydrocarbon fluid normally miscible with said hydrocarbons, the improvement which comprises incorporating into said first hydrocarbon fluid an additive which will form a solid film on contact with connate water selected from the group consisting of high molecular weight aliphatic acids and alcohols ranging from 12 to 20 carbon atoms in chain length, said additive initially forming a solution in said first hydrocarbon fluid ranging between 0.001 and 0.1 molal and thereby increasing the percentage of hydrocarbons produced prior to breakthrough.

2. The method of claim 1 wherein said additive is dodecanoic acid.

3. The method of claim 1 wherein said additive is tetradecanoic acid.

4. The method of claim 1 wherein said additive is hexadecanoic acid.

5. The method of claim 1 wherein said additive is octadecanoic acid.

6. The method of claim 1 wherein said additive is eicosanoic acid.

7. The method of claim 1 wherein said additive is dodecyl alcohol.

8. The method of claim 1 wherein said additive is tetradecyl alcohol.

9. The method of claim 1 wherein said additive is hexadecyl alcohol.

10. The method of claim 1 wherein said additive is octadecyl alcohol.

11. The method of claim 1 wherein said additive is eicosyl alcohol.

References Cited in the file of this patent

UNITED STATES PATENTS

| | | |
|---|---|---|
| 2,267,548 | Berl | Dec. 23, 1941 |
| 2,669,306 | Teter | Feb. 16, 1954 |
| 2,823,751 | Offeringa | Feb. 18, 1958 |
| 2,867,277 | Weinaug | Jan. 6, 1959 |
| 2,882,973 | Doscher | Apr. 21, 1959 |